United States Patent [19]

Tarancon

[11] Patent Number: 4,484,954
[45] Date of Patent: Nov. 27, 1984

[54] HALOGENATION TREATMENT

[75] Inventor: Gregorio Tarancon, Woodbridge, N.J.

[73] Assignee: Union Carbide Corporation, Danbury, Conn.

[21] Appl. No.: 404,814

[22] Filed: Aug. 3, 1982

[51] Int. Cl.$^3$ ............................................. C23C 11/00
[52] U.S. Cl. .................................. 148/6.3; 148/6.31; 148/6.35; 525/356; 525/333.7; 525/334.1
[58] Field of Search ................ 525/356; 148/6.3, 6.35, 148/6.31

[56] References Cited

U.S. PATENT DOCUMENTS

| | | | |
|---|---|---|---|
| 3,009,906 | 11/1961 | Eichhorn et al. | 525/356 |
| 3,598,708 | 8/1971 | Jackson, Jr. | 525/356 |
| 3,639,510 | 2/1972 | Paine | 525/356 |
| 3,758,450 | 9/1973 | Margrave et al. | 525/356 |
| 3,765,929 | 10/1973 | Martin | 148/6.35 |
| 3,775,489 | 11/1973 | Margrave et al. | 260/648 F |
| 3,992,221 | 11/1976 | Homsy et al. | 134/21 |
| 4,142,032 | 2/1979 | D'Angelo | 525/356 |

Primary Examiner—Joseph L. Schofer
Assistant Examiner—Bernard Lipman
Attorney, Agent, or Firm—Saul R. Bresch

[57] ABSTRACT

A batch process for the halogenation of solid polymeric or metallic material comprising the following steps:

(a) providing a closed system comprising a chamber containing air at about atmospheric pressure and having inlet and outlet means, a heat exchanger, and a circulation pump, all connected in series;
(b) introducing the material into the chamber;
(c) heating the chamber and the material to a selected temperature in the range of about 100° F. to about 200° F. by recirculating the air through the heat exchanger;
(d) evacuating the system;
(e) introducing a halogen into the system in an amount (i) of up to about 10 percent in excess of the theoretical amount of halogen required to halogenate the polymeric material to a desired depth and (ii) sufficient to provide a partial pressure in the system in the range of about 0.1 psia to about 3 psia;
(f) introducing an inert gas into the system in an amount sufficient to provide a total pressure in the system of about one atmosphere;
(g) maintaining the selected temperature by recirculating the halogen/inert gas mixture through the heat exchanger;
(h) recirculating the halogen/inert gas mixture a sufficient number of times to reduce the amount of halogen to less than about 5 percent of the amount of halogen initially introduced into the system;
(i) evacuating the system;
(j) introducing air into the system to provide about atmospheric pressure; and
(k) removing the material.

4 Claims, No Drawings

HALOGENATION TREATMENT

TECHNICAL FIELD

This invention relates to a process for the surface halogenation of polymeric materials to reduce their permeability to solvents and of polymeric and metallic materials to increase their chemical resistance.

BACKGROUND ART

Surface modification of plastics, whether of the rigid or flexible type, with fluorine or other halogens has been found to be commercially advantageous in that it is capable of providing, for example, containers having a reduced permeability insofar as liquids having solvent characteristics are concerned and having increased chemical resistance to various liquids and gases which would otherwise react with the unfluorinated container material. One such process and the apparatus therefor is described in U.S. Pat. No. 3,998,180, which is incorporated by reference herein. The disadvantages of this and other halogenation processes having surface modification as an objective are manifold. Some of the processes need a great deal of apparatus because of the steps and conditions imposed by the process, which may entail moving the fluorine, for example, from a holding chamber to a reaction chamber and back again, or the use of very low or high pressures. The more apparatus, of course, the higher the cost factor. Other processes pose a threat to safety. After all, fluorine is a highly toxic, highly corrosive, irritating gas. It is the most reactive element known. Fluorine vigorously reacts with almost all organic and inorganic substances, and because of its highly oxidizing nature, has a fire potential exceeding that of even oxygen. Any process that uses relatively high temperatures, pressures, and/or concentrations of fluorine falls into the hazardous category by increasing the possibility of fire or leakage. Finally, some processes raise the pollution factor because of the amount of fluorine and/or fluorine by-products, such as hydrogen fluoride, which have to be disposed of after the fluorination process is completed. The problems of more apparatus, safety, and pollution are, of course, interrelated because in order to solve the latter problems of safety and pollution, the quantity of apparatus is usually increased and, concomitantly, the investment and operating costs including energy requirements. It is not surprising, then, that industry is constantly striving to decrease the amount of apparatus needed to carry out the surface modification and/or increase the safety factor.

DISCLOSURE OF THE INVENTION

An object of this invention, therefore, is to provide an improvement in a process for modifying the surface of plastic or metallic materials with a halogen whereby the amount of apparatus required for the process is decreased and the safety factor is increased.

Other objects and advantages will become apparent hereinafter.

According to the present invention, a batch process for the halogenation of solid polymeric or metallic material has been discovered comprising the following steps:

(a) providing a closed system comprising a chamber containing air at about atmospheric pressure and having inlet and outlet means, a heat exchanger, and a circulation pump, all connected in series;

(b) introducing solid polymeric or metallic material into the chamber;

(c) heating the chamber and the material to a selected temperature in the range of about 100° F. to about 200° F. by recirculating the air through the heat exchanger;

(d) evacuating the system;

(e) introducing a halogen into the system in an amount (i) of up to about 10 percent in excess of the theoretical amount of halogen required to halogenate the polymeric material to a desired depth and (ii) sufficient to provide a partial pressure in the system in the range of about 0.1 psia to about 3 psia;

(f) introducing an inert gas into the system in an amount sufficient to provide a total pressure in the system of about one atmosphere;

(g) maintaining the selected temperature by recirculating the halogen/inert gas mixture through the heat exchanger;

(h) recirculating the halogen/inert gas mixture a sufficient number of times to reduce the amount of halogen to less than about 5 percent of the amount of halogen initially introduced into the system;

(i) evacuating the system;

(j) introducing air into the system to provide about atmospheric pressure; and (k) removing the material.

DETAILED DESCRIPTION

Subject process is a batch process as opposed to a continuous process. The plastic or metallic items to be halogenated are loaded into a chamber, halogenated, and removed. Then, the process is repeated. The term "halogen" is defined herein to include any of the halogens or mixtures thereof. They are used in subject process in the gaseous state. The preferred halogens are fluorine and a mixture of fluorine and bromine. The apparatus and process steps and conditions described hereinafter are generally applicable to the halogens as a group.

The items to be treated may be structurally rigid or flexible and of a great variety of shapes, sizes, textures, and chemical compositions. The most common items processed are plastic containers, particularly bottles, but sheets, films, pipes and parts for automobiles and other devices are contemplated, as well as metal pieces, urface constituents with the halogen of choice.

The process utilizes conventional equipment arranged to carry out the prescribed steps under the stated conditions. A typical system will be described here. Such a system comprises a chamber having a volume of 5000 cubic feet constructed on two steel skids. The chamber has one or two doors opened hydraulically with a door area of about 50 square feet. The connections for the process piping are four inch nominal pipe thread flanged openings. While the apparatus is designed to easily accept a pressure range running from full vacuum to 45 pounds per square inch absolute (psia) and temperatures in the range of about 70° to about 400° F., the operating temperature for subject process will be in the range of about 100° to about 200° F. and preferably in the range of about 120° F. to about 180° F., and the operating pressure will be in the range of about 0.1 psia to about one atmosphere.

The walls of the chamber can be heated to assist in maintaining a particular temperature in the chamber, but this feature is optional. The top and bottom of the chamber will have connections for manifolds, which, in turn, will have connections for air, inert gas, and, in this case, fluorine, and for recirculation and evacuation. Both the chamber and manifold will have miscellaneous connections for thermocouples, pressure transducers, gas sampling tubes, and other control equipment.

One or two single stage vacuum pumps can be used to achieve gas circulation as well as system evacuation. They can be rotary vane vacuum pumps connected in series. A magnetic centrifugal blower can be used to circulate the gas mixture in lieu of the vacuum pumps, but, in any case, the vacuum pumps will be used for evacuation.

All of the equipment, which comes in contact with the fluorine, such as the chamber, manifolds, piping, and heat exchangers are made of passivated stainless steel, e.g., AISI type 304L.

One or more heat exchangers are used to control the temperature of the system. They are of extended surface tube and shell design with a minimum capacity of 100,000 BTU's per hour to handle the 5,000 cubic foot chamber. The chamber, the heat exchangers, and the circulation pump, which may be a vacuum pump or blower, are connected in series to form a closed loop or system with all of the valves needed to give complete control of the system. Where a blower is used together with the vacuum pump, the two are connected in parallel. A two or three stage liquid slurry scrubber with a slurry pump is connected to the vacuum pump to convert any process by-products to suitable landfill. All of the valves are bellows sealed gate valves. The entire system is carefully sealed to prevent leakage and the parts are selected with this in mind.

It will be understood by those skilled in the art that the apparatus used in the system is a combination of conventional off-the-shelf equipment, which can handle halogens, e.g., the chamber can be one used in sterilizer service, and that many variations can be used. The apparatus can also be scaled up or down, i.e., it can be sized according to the commercial application and the quantity of material to be treated in each batch.

The process is initiated by introducing the material to be treated into the chamber of the closed system. At this point, air is present in the chamber at atmospheric pressure. The vacuum pump or blower is then activated in order to circulate the air through the loop. The heat exchanger is also started up to provide a temperature in the range of about 100° F. to about 200° F. and preferably in the range of about 120° F. to about 180° F. The air is heated and recirculated until the interior walls of the chamber and the material to be treated are at a temperature preferably in the latter range of about 120° F. to about 180° F. This step removes any moisture from the items to be treated. Once the chamber and its contents reach the selected temperature, the air is evacuated from the system by means of the vacuum pump down to a pressure of less than about 1 psia and preferably less than 0.5 psia.

Fluorine is then introduced into the system in an amount of up to about 10 percent by weight in excess of the theoretical amount of fluorine required to fluorinate the material to a desired depth. Preferably, the fluorine is added in an amount of about 5 percent by weight in excess. The fluorine is also introduced in sufficient quantity to raise the partial pressure in the system to about 0.1 to about 3 psia, and preferably about 0.1 to about 1 psia. The amount of fluorine, within the stated ranges, necessary to fluorinate the surface of the material to the desired depth, i.e., a depth which will provide the permeability and/or chemical resistance required for the service to which the material is to be put, is based on past experience accumulated by trial and error. This method of determination is used because of the unlimited number of variables which arise with regard to the materials to be treated, e.g., size, shape, chemical composition, use, i.e., depth of fluorination needed therefor, and number of items (or total surface area) to be treated. The size and shape of the chamber, as well as the velocity at which the fluorine is to be recirculated, are other variables to be taken into account.

An inert gas, preferably nitrogen, is then injected into the system in an amount sufficient to provide a total pressure of about one atmosphere. Any gas, which will not react with the material to be treated, the apparatus, and the fluorine can be used, however, as stated, a low partial pressure of air, i.e., less than about one psia, will not affect the process. Neither the fluorine nor the inert gas have to be preheated before introduction into the system.

While it is preferred that the fluorine be introduced prior to the inert gas, many variations of this procedure are acceptable. For example, the inert gas or a mixture of fluorine and inert gas can be injected first, or some fluorine or inert gas can be introduced first, followed by the mixture.

The fluorine/inert gas mixture is recirculated through the heat exchanger to maintain the selected temperature. The temperature of the heat transfer fluid passing through the shell side of the heat exchanger is externally controlled to accomplish this objective. In this way, the system is operated isothermally, and the results become more predictable. The linear velocity of the mixture is also kept constant. Typical linear velocities are in the range of about 0.1 foot per second to about 10 feet per second. The constant linear velocity together with a slight excess of fluorine provide enough fluid dynamics so that turbulent flow can be achieved and maintained in the chamber. These linear velocities allow for about 1 to about 200 changes (or recycles) of atmosphere per minute.

The mixture is recirculated a sufficient number of times to reduce the amount of fluorine to less than about 5 percent of the amount of fluorine initially introduced into the system, and, preferably, to less than about 2 percent. The objective here, of course, is to react the theoretical amount required for reaction with the material. While this precision is not achieved in practice, the amount of expensive fluorine remaining is small. About 99.0 percent of the remaining fluorine is turned into hydrogen fluoride. This by-product is removed by evacuating the system, once more, down to less than 1 psia and preferably less than about 0.1 psia. The by-product is directed to a liquid slurry scrubber, converted to landfill, and thus disposed of. A cascading calcium carbonate slurry scrubber which forms insoluble calcium fluoride can be used effectively here.

Rather than calculating the number of times the fluorine/inert gas is recirculated to reduce the fluorine concentration, the residence time or dwell time of the material in the chamber can be determined. This is accomplished by analyzing both the depth of fluorine penetration in the material to be treated and the off-gas, which is sent to the scrubber. The former is most important because it confirms the end result, i.e., whether the fluorinated item will be capable of performing as intended. The latter is an indication of the efficiency of the process, once the parameters have been set, taking all of the variables into account. Typical residence times are in the range of about 1 to about 1000 minutes for a load of medium size (one quart or liter) polyethylene bottles in a 5,000 cubic foot chamber. Residence time has, however, a lower priority than other features of subject process such as safety, reduction in amount of equipment, and efficient utilization of fluorine. Thus, the residence time will be extended in favor of the latter features.

After the system is evacuated, air is permitted to enter, atmospheric pressure is restored, and the fluorinated materials are removed. It is noted that this air also functions as a purge for any residual fluorine which may have diffused into the plastic.

The advantages of the system are as follows: 1. Isothermal control provides a constant temperature throughout the system, which aids in achieving a uniform result. 2. Constant recirculation tends to eliminate concentration gradients across the chamber. 3. The capacity of operating at low temperatures and pressures all but eliminates the risk of fire and leakage. 4. The efficient utilization of halogen not only reduces the cost of this expensive gas, but reduces the pollution factor immeasurably. 5. Since there is no limit on the size of the chamber, the chamber can be sized to provide the daily requirement of the treater in one batch, and the batch will be uniformly treated. 6. Preheating or premixing of the halogen and/or inert gas are not required or even beneficial. 7. Just as there is no need for high pressures, there is no need for extremely low pressures, e.g., pressures below about 20 millimeters of mercury. This relieves both the equipment and the energy cost. 8. The air that is used in the system does not have to be dried prior to entry. The air mentioned in step (a) is used to heat the material to be fluorinated and carries off any moisture on evacuation in step (d). The air introduced in step (j) is used to purge the system of fluorine.

I claim:

1. A batch process for the halogenation of solid polymeric or metallic material comprising the following steps:

(a) providing a closed system comprising a chamber containing air at about atmospheric pressure and having inlet and outlet means, a heat exchanger, and a circulation pump, all connected in series;

(b) introducing the material into the chamber;

(c) heating the chamber and the material to a selected temperature in the range of about 100° F. to about 200° F. by recirculating the air through the heat exchanger;

(d) evacuating the system to a pressure of less than about 1 psia;

(e) introducing a halogen into the system in an amount (i) of up to about 10 percent in excess of the theoretical amount of halogen required to halogenate the material to a desired depth and (ii) sufficient to provide a partial pressure in the system in the range of about 0.1 psia to about 3 psia;

(f) introducing an inert gas into the system in an amount sufficient to provide a total pressure in the system of about one atmosphere;

(g) maintaining the selected temperature by recirculating the halogen/inert gas mixture through the heat exchanger;

(h) recirculating the halogen/inert gas mixture a sufficient number of times to reduce the amount of halogen to less than about 5 percent of the amount of halogen initially introduced into the system;

(i) evacuating the system to a pressure of less than about 1 psia;

(j) introducing air into the system to provide about atmospheric pressure; and (k) removing the material.

2. The process defined in claim 1 wherein the temperature range in step (c) is about 120° F. to about 180° F.; the percent in excess of halogen in step (e) (i) is up to about 5 percent; and the reduction of the amount of halogen in step (h) is to less than about 2 percent of the halogen initially introduced into the system.

3. The process defined in claim 1 wherein the halogen is fluorine or a mixture of fluorine and bromine.

4. The process defined in claim 2 wherein the halogen is fluorine or a mixture of fluorine and bromine.

* * * * *